United States Patent [19]

Barrett, Sr. et al.

[11] Patent Number: 4,635,844

[45] Date of Patent: Jan. 13, 1987

[54] ELECTRONIC CONTROL DEVICE FOR LIQUIDS

[75] Inventors: John P. Barrett, Sr., 879 Harbor Island, Clearwater, Fla. 33515; Daniel R. Schulz, Crystal Beach, Fla.

[73] Assignee: John P. Barrett, Sr., Clearwater, Fla.

[21] Appl. No.: 510,750

[22] Filed: Jul. 5, 1983

Related U.S. Application Data

[62] Division of Ser. No. 428,921, Sep. 30, 1983, Pat. No. 4,409,694.

[51] Int. Cl.[4] ............................................. G05D 23/185
[52] U.S. Cl. ................................ 236/12.12; 137/552.5
[58] Field of Search ..................... 236/12.11, 12.12; 364/502; 137/3, 552.5, 601

[56] References Cited

U.S. PATENT DOCUMENTS

| | | | |
|---|---|---|---|
| 3,437,098 | 4/1969 | Stark et al. | 137/552.5 |
| 3,581,984 | 6/1971 | Buechner | 236/12.12 |
| 4,406,401 | 9/1983 | Nettro | 236/12.12 |
| 4,421,269 | 12/1983 | Si-Ling Ts'Ao | 236/12.12 |

Primary Examiner—William E. Wayner
Attorney, Agent, or Firm—Frijouf, Rust & Pyle

[57] ABSTRACT

An electronic device is disclosed for controlling the temperature of a liquid such as water flowing into a container such as a bathtub or the like. The device also controls the level of liquid within the container and includes a solid state circuit in conjunction with a temperature sensing device for maintaining the temperature of the liquid within the container to a preselected level. The control device includes a plurality of switches for preselecting the required temperature and liquid level. Switches are also provided for selecting the use of the bathtub as a bath or as a shower. The flow and mixing of water into the bathtub and the flow of water out of the bathtub is accomplished by solenoid flow control valves responsive to the control device. The invention may be applied to industrial, commercial, medical or residential applications and the like.

4 Claims, 11 Drawing Figures

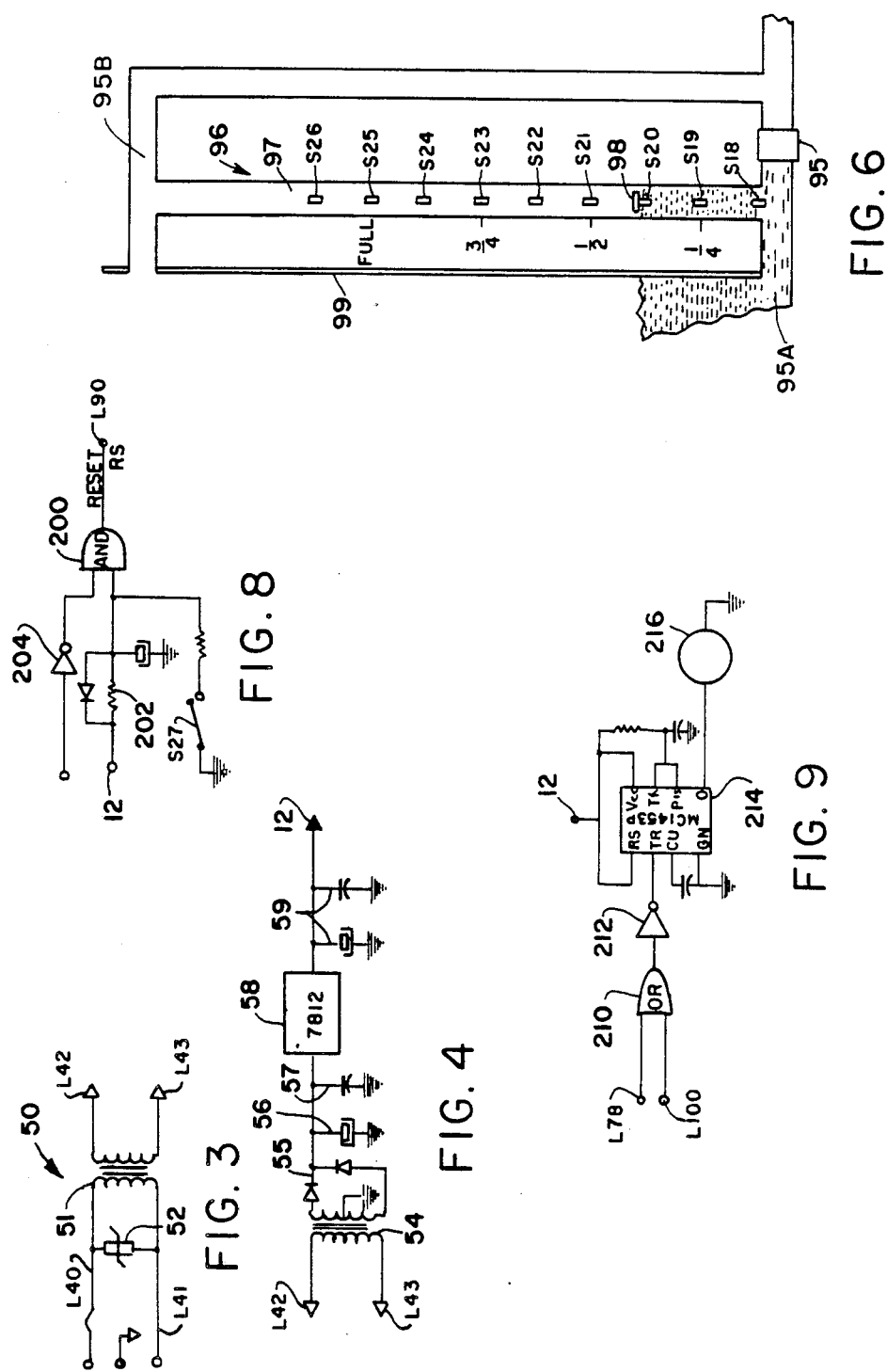

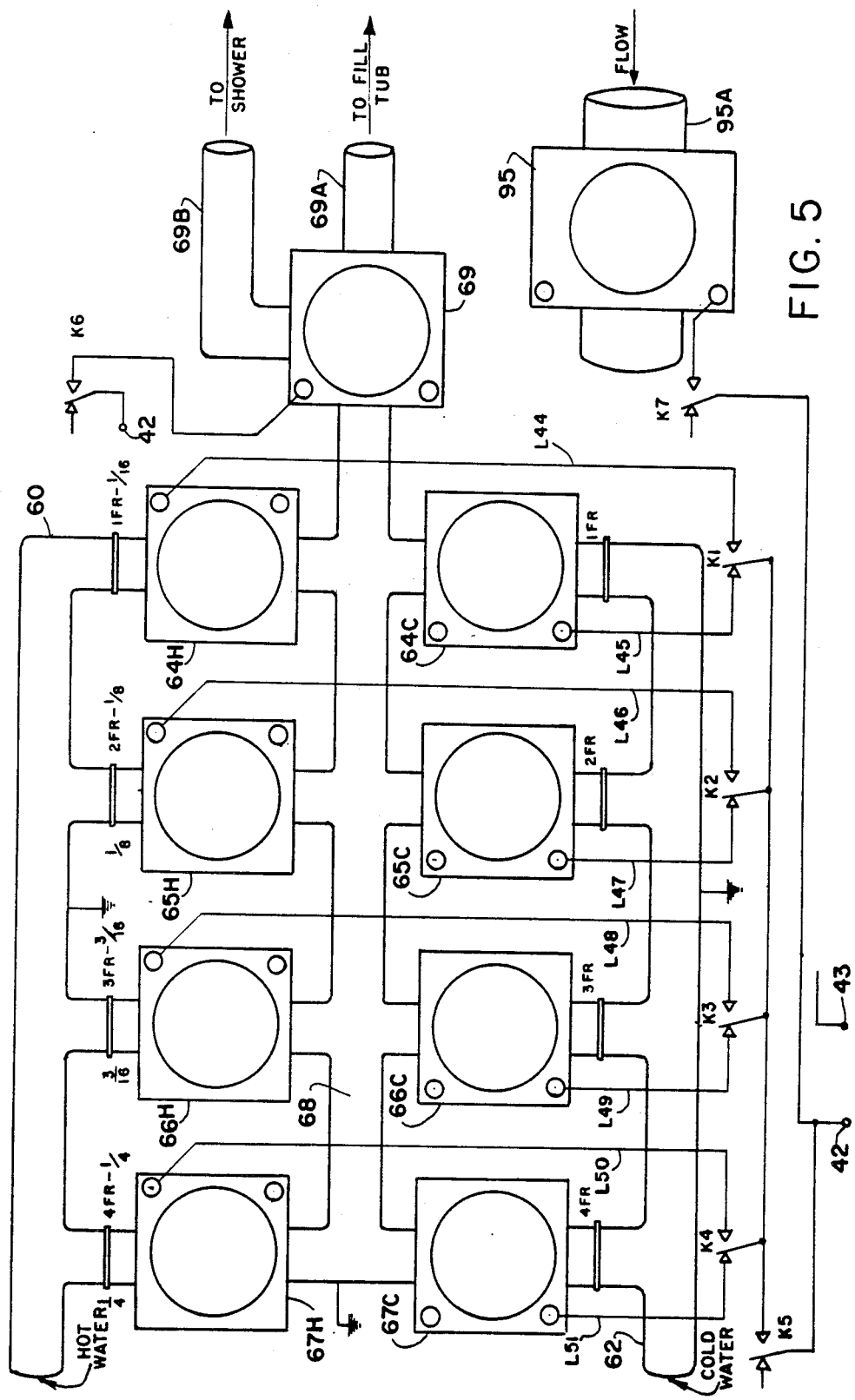

ELECTRONIC CONTROL DEVICE FOR LIQUIDS

This application is a divisional application of Ser. No. 428,921 filed Sept. 30, 1983 now U.S. Pat. No. 4,409,694.

BACKGROUND OF THE INVENTION

1. Field of the Invention

This invention relates to an electronic control device for controlling the temperature of flowing liquid, for controlling the level of the liquid within a container and for maintaining the desired temperature within the container.

2. Information Disclosure Statement

Various types of devices have been used for controlling the temperature and level of a liquid within a container. In addition, liquid controlling devices have found use in industrial, commercial, residential and medical applications. One particular application for liquid controlling devices is the home use of water such as bathtubs, sinks, showers and the like.

Historically, many types of baths and bathtubs have been manufactured. The Romans were renowned for their ingenuity as to the provision of various types of baths. More recently, attention has turned to the manufacture of a bathtub that will not only enhance the ease with which an operator may take a bath or shower, but more particularly a need has existed in the art for controlling the temperature and flow functions of the water within the bath. In the past it has been customary for the person desiring a bath to close the drain plug manually and then turn the hot and cold water faucets to the required setting to fill the bath with the requisite level of water. When the water level has reached the required height, the faucets are closed and the bath is ready for use.

However, certain problems have been experienced in carrying out the various operations as outlined hereinbefore. First, with many elderly or infirm persons, bending over a bathtub to close the drain presents a serious problem. Second, when a bath is to be run and the hot water faucet is opened before the cold one, scalding can take place unless approximately the correct setting of the hot and cold water faucets is already known. Third, if the flow of water from the open faucet is relatively slow, there exists a temptation to become involved with another task while the bath is running and this often results in the bath overflowing or at least a waste of hot water if the faucets are not closed when the required water level is reached. Fourth, there is no provision in a conventional bathtub to maintain the water temperature at a desired level.

Referring to the prior art, U.S. Pat. No. 2,991,481 to Booke discloses an electronic control circuit for controlling the mixing of hot and cold water from a supply prior to flowing into a bathtub. Although this invention describes an overflow shut-off device for stopping the flow of water into the bathtub when the water level reaches an overflow, no disclosure is made of a selective level control. Furthermore, no disclosure is made of means for maintaining the preselected temperature of the water within the bathtub.

U.S. Pat. No. 4,042,984 to Butler, describes an automatic drain control and electronic circuit for controlling the quantity of water flowing into a bathtub. However, the quantity of water supplied is dependent on a clock controlled solenoid valve and not on the water level. Therefore, in the event of an increase in water pressure, the quantity of water supplied to the bathtub would exceed the required quantity and might result in an overflow.

U.S. Pat. No. 4,202,060 to Touze, discloses a bathtub having a sidewall access and a float controlled water level governing device.

U.S. Pat. No. 4,248,444 to Orszullok discloses a capacitive proximity switch for detecting the level of water within a bathtub. U.S. Pat. No. 4,080,985 to Eagle, describes the operation of a float which slides within a tube to control the level of water entering a bathtub. U.S. Pat. No. 2,991,482 to Brass, describes a side entry bathtub but does not disclose any control circuitry regarding temperature or water levels. Various other devices have been proposed for regulating the water level and temperature of washing machines and the like, but have not solved the major problems of the prior art.

Although the aforementioned patents solve many of the needs of the prior art by providing level controls and temperature controls, none of the prior art devices teach an electronic control device which will selectively control the temperature with which the liquid is delivered to a container, maintain the required temperature of liquid within the container and control the level to which the liquid within the container will rise. Therefore, it is a primary object of the present invention to provide an electronic device that overcomes the aforementioned inadequacies of the prior art devices and provides an improvement that significantly contributes to the electronic control not only of the temperature of liquid entering the container, but also the maintenance of the temperature of the liquid within the container regardless of the loss of heat to the surroundings.

Another object of the present invention is the provision of an electronic control device which automatically permits the liquid level to rise to a preselected level within the container and to maintain such level in the event that the volume of liquid is displaced by an object entering the container.

Another object of the present invention is the provision of an electronic control for a bathtub in which the opening or the closing of the bathtub door is controlled in accordance with a preselected switch.

Another object of the present invention is the provision of an electronic control for regulating the water level, drain and shower head functions by means of solid state circuitry.

A further object of the present invention is the provision of an electronic control for a bathtub having a side access which is particularly suitable for use by infirm or aged persons.

A still further object of the present invention is the provision of an electronic control device for a bathtub which affords a degree of control heretofore unknown in the art.

A further object of the present invention is the provision of a display circuit for displaying the temperature of a liquid within a container.

The foregoing has outlined some of the more pertinent objects of the present invention. These objects should be construed to be merely illustrative of some of the more prominent features and applications of the present invention. Many other beneficial results can be obtained by applying the disclosed invention in a different manner or modifying the invention within the scope of the disclosure. Although the invention is described with reference to a bathtub, it should be appreciated by those skilled in the art that the invention may find application in industrial, commercial and medical applications and the like.

SUMMARY OF THE INVENTION

The electronic control device of the present invention is defined by the appended claims with a specific embodiment shown in the attached drawings. For the purpose of summarizing the invention, the invention relates to an electronic control device for a container, bathtub or the like. The control device comprises an electrical power supply, a first electronic control circuit for controlling the temperature of liquid flowing into a container, a second electronic control circuit controls the level of liquid within the container and a third electronic circuit maintains a preselected temperature for the liquid within the container. The first, second and third circuits are all electrically connected to the electrical power supply.

More particularly, the electronic control circuits may also control the flow of liquid at a preselected temperature to a shower head. Additionally, the electronic control controls the opening and closing of the drain.

In a more specific embodiment of the present invention adapted to a bathtub, the electronic control includes a plurality of solid state circuits for controlling not only the preselected temperature of water entering the bathtub, but also to maintain the temperature of the water within the bathtub regardless of the loss of heat to the surroundings. These circuits also control the level to which the water within the bathtub will reach regardless of the displacement of water from the bathtub caused by a person entering the bathtub.

The foregoing has outlined rather broadly the more pertinent features of the present invention in order that the detailed description of the invention that follows may be better understood so the present contribution to the art can be more fully appreciated. Additionally, features of the invention will be described hereinafter which form the subject of the claims of the invention. It should be appreciated by those skilled in the art that the conception and specific embodiment disclosed may be readily utilized as a basis for modifying or designing other devices for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following description taken in conjunction with the accompanying drawings in which:

FIG. 3 is an electrical circuit diagram of a power supply electrically isolated from other potentially dangerous power sources;

FIG. 4 is an electrical circuit diagram of a low voltage power supply, also electrically isolated from all other power sources;

FIG. 5 is a diagram of a plurality of solenoid operated valves controlled by the circuits of FIGS. 1, 3, 4 and 7;

FIG. 6 is a side view of a sensor for determining the level of liquid within a container;

FIG. 8 is an electronical circuit diagram for controlling the opening of an access door to the container and ensuring that all circuits return to a predefined state in the event of loss of power or failure of any critical circuit;

FIG. 9 is an electrical circuit diagram for providing an audible signal upon entry of data into the control circuits;

Similar reference characters refer to similar parts throughout the several views of the drawings.

DETAILED DESCRIPTION

The invention as set forth herein comprises an electronic circuit which provides isolation and power to drive the system; a temperature selecting code and control for the liquid; a control for the level of the liquid, a liquid temperature control circuit and a display circuit. Although the system will be described with reference to a system for controlling water within a bathtub or the like, it should be understood by those skilled in the art that the invention as set forth herein may be utilized in any type of liquid handling system including commercial, industrial, medical, residential or the like. The specific example in a bathtub application should not be construed as limiting the scope of the claimed subject matter.

Figures 1, 2:
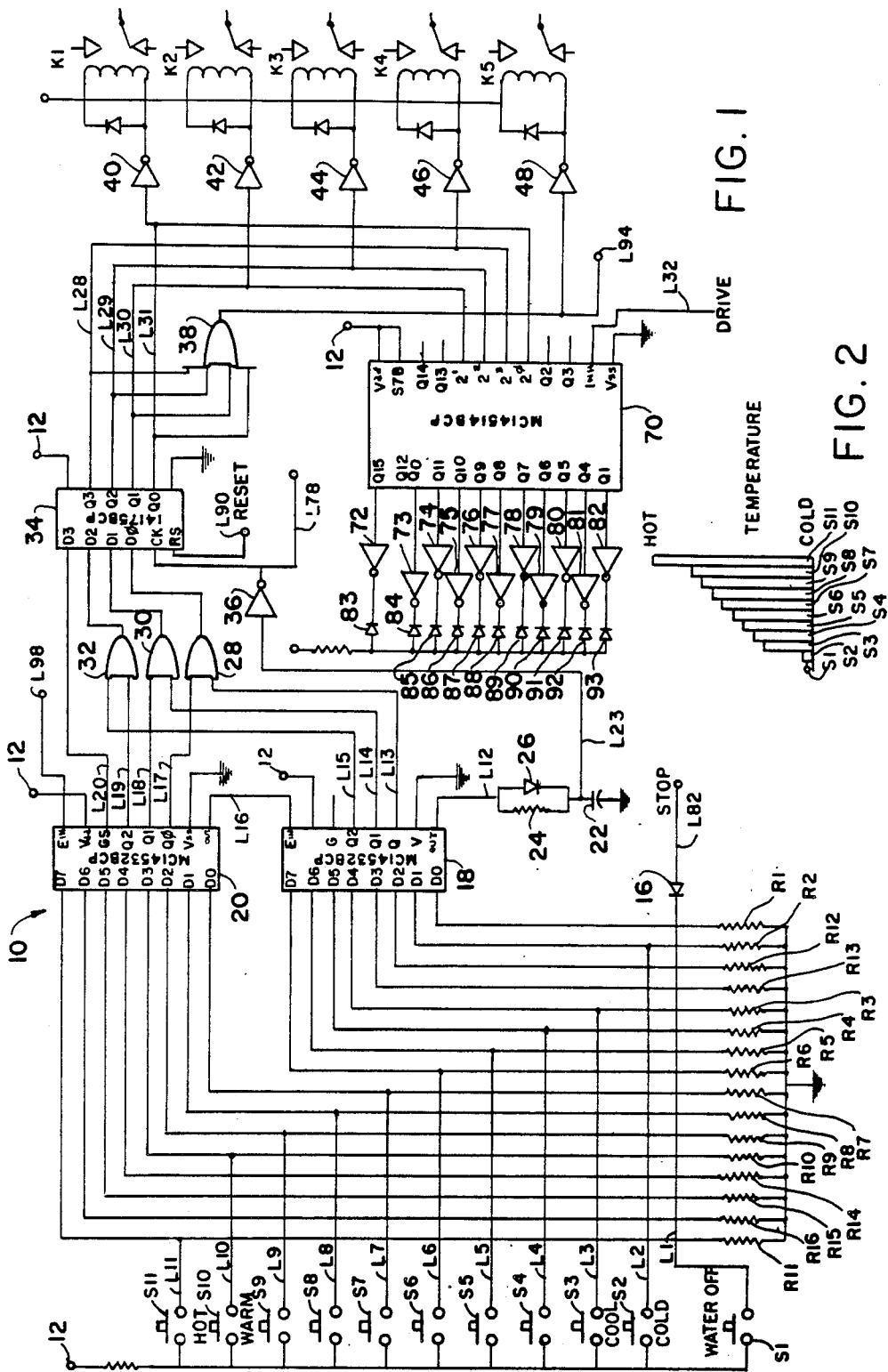
FIG. 1 is an electrical circuit diagram of an electronic control means for controlling the temperature of liquid flowing into a container.
FIG. 2 is a bar graph representing the liquid temperature corresponding with one of the plurality of preselected switches.

FIG. 1 illustrates a temperature circuit for controlling the temperature of a liquid being introduced into a container (not shown). FIG. 1 is an electrical circuit diagram for a first electronic control means generally designated 10 for controlling the temperature of a liquid flowing into a container or in a specific embodiment, a bathtub. The liquid flowing into a container is regulated by eight control valves shown in FIG. 5 operated by relays K1-K5 for controlling the temperature of the liquid input.

Referring in detail to circuit 10, a plurality of independently actuated electrical switches S1-S11 are electrically connected in parallel between a source of electrical power 12 and a plurality of pulldown resistors R1-R11. Switch S1 is a water OFF switch whereas S2-S11 correspond to ascending temperature settings of the desired liquid input. FIG. 2 illustrates the relative temperature corresponding to switches S1-S11 which relative temperature may be selected by the desired application of the invention.

Upon closing of any switches S1-S11, electrical current flows through one of the parallel line L1-L11 to one of two priority encoders 18 and 20. Resistors R1-R11 provide a logical "O" to the priority encoders 18 and 20 when all of the switches S1-S11 are in an open condition. Switch S1 is also connected through line L1 to a diode 16 which will be described in more detail hereinafter.

A first and second priority encoder 18 and 20 each shown as a MC14532BCP, are connected to the pulldown resistor R1-R16 as shown in FIG. 1. The closing of one of the selected switches S1-S11 provides an input to one of the first and second priority encoders 18 and 20. A priority encoder, such as 18 and 20, provides a binary coded output corresponding to the highest priority of line input to produce a single selected output. Accordingly, if S9 is closed, the second priority coder 20 will provide a digital numerical output corresponding to S9 irrespective of whether any of the switches S1-S8 are closed.

The first priority encoder 18 includes three Q outputs corresponding to lines L13-L15 whereas the second priority encoder 20 provides three Q outputs corresponding to lines L17-L19. The outputs of the first and second priority encoders 18 and 20 on lines L13-L15 and L17-L19 are applied to OR gates 28, 30 and 32. Accordingly, the combined outputs of OR gates 28, 30 and 32 with line L20 provide a digital code corresponding to the highest switch number of switches S1-S11 which is selected by the operator. The circuit, as set forth, enables sixteen possible temperature levels to be provided although only ten switches are utilized in this application. When this invention is applied to input water in a bathtub for example, temperature variations of 2 or 3 degree steps can be achieved for normal bathing temperatures, but it should be understood that for other applications, other incremental temperatures may be utilized.

The EOUT terminal of priority encoder 18 is connected through line L12 to a RC network comprising capacitor 22, resistor 24 and diode 26. EOUT of priority encoder 20 is connected by line L16 to EIN of priority encoder 18. The EIN input of priority encoder 20 will be discussed with reference to FIG. 7. In the quiescent state, EOUT on line L12 is high so if any of switches S1-S11 is pushed, EOUT changes to a low condition enabling capacitor 22 to discharge. The low condition is transferred by line L23 to inverter 36 which is connected to a clock input of a latch 34 shown as a 14175BCP. Latch 34 receives the outputs from OR gates 28, 30, 32 and line L20 corresponding to the binary code of one of the selected switches S1-S11. The time constant of the RC network of capacitor 22 and resistor 24 provides a sufficient time to allow data from OR gates 28, 30, 32 and line L20 to stabilize before transferring the data to latch 34.

Latch 34 will maintain the data set by the operator until another switch is depressed by the operator to reset the desired liquid temperature. The output of latch 34 drives inverters 40, 42, 44 and 46 on lines L28, L29, L30 and L31 to energize relays K1-K4 respectively. The outputs on lines L28, L29, L30 and L31 also drive an OR gate 38 connected to inverter 48 to energize relay K5. Relay K5 provides the power to K1-K4 whereas relays K1-K4 provide different liquid temperatures as will be described hereinafter with reference to FIG. 5. Accordingly, any output on lines L28-L31 will energize relay K5 to provide electrical power for liquid to flow whereas the specific digital coding from outputs Q0-Q3 of latch 34 will selectively energize relays K1-K4 for providing the properly selected temperature.

Lines L28-L31 are also applied to the inputs of a one of sixteen decoder 70 shown as a MC14514BCP. The outputs of the decoder 70 are applied to inverters 72-82 to drive light emitting diodes 83-93 for providing a visual indication for indicating the temperature selected by the operator corresponding to S1-S11. Line 32 connects an enable input of decoder 70 to an oscillator 71 shown in FIG. 7, enabling the light emitting diodes 83-93 to flash the output thereof to the user.

The operation of this circuit commences with the momentary closing of one of switches S1-S11 by the operator in accordance with the desired temperature of the liquid. The priority encoders 18 and 20 are means for providing a digital coding of the desired temperature through OR gates 28, 30, 32 and line L20 to latch 34. Capacitor 22 and resistor 24 provide the necessary time delay to stabilize data to latch 34 from OR gates 28, 30, 32 and line L20. Latch 34 provides means for storing data and providing an output on lines L28-31 corresponding to one of the selected switches S1-S11. The output of latch 34 is applied to energize selected ones of relays K1-K4 for providing the proper operating temperature in addition to energizing K5 to provide power to K1-K4. The output from latch 34 is also applied to decoder 70 to energize the selected light emitting diodes 83-93 to give a visual indication of the temperature selected.

FIG. 3 illustrates a basic power supply circuit 50 comprising input lines L40 and L41 being applied to the primary of an isolation transformer 51. A metal oxide varistor 52 controls voltage surges in the input lines L40 and L41. The secondary of the isolation transformer 51 is connected to lines L42 and L43 and connected to a stepdown transformer 54 shown in FIG. 4. The secondary of transformer 54 drives a rectifier circuit 55, filter capacitors 56 and 57, and a voltage regulator circuit 58. Additional filtering is provided to this power supply through capacitors 59. The arrangement of such a power supply should be well known to those skilled in the art.

FIG. 5 is a diagram of a valve system having a hot liquid input conduit 60 and a cold liquid input conduit 62. As shown here, the hot and cold water input conduits 60 and 62 are preferably ⅜ inch diameter. Eight normally closed solenoid operated valves are disclosed with valve 64H and 64C being controlled by relay K1, 65H and 65C being controlled by relay K2, 66H and 66C being controlled by relay K3 and 67H and 67C being controlled by relay K4. An output conduit 68 is connected to a two-way valve 69 to direct a flow of liquid through a conduit 69A to fill a first container such as a bathtub with a conventional spigot, or in the alternative, to direct the flow of liquid to a secondary conduit 69B to a shower or the like.

The valves 64H and 64C each includes a 1FR flow restrictor which may be in the form of a washer having a 1/16 inch diameter port therethrough. Similarly, valves 65H and 65C each have a 2FR flow restrictor having a ⅛ inch diameter port. Valves 66H and 66C each include a 3FR flow restrictor, 3FR having a 3/16 inch diameter port whereas valves 67H and 67C each has a 4FR flow restrictor having a ¼ inch diameter port.

Relays K1-K4 are connected to valves 64H-67H and 64C-67C by lines L44-L51. K1-K4 are shown in the inactivated position. The return lines to valves 64H-67H and 64C-67C are not shown for the sake of simplicity. Relay K5 controls power to relays K1-K4. Relays K1-K2 are connected such that only one of the associated solenoid valves, for example 64H or 64C, is open at any given time. For safety reasons, K1-K4 are connected to energize the cold liquid valves 64C-67C if K1-K4 are not activated as shown in FIG. 4. In addition, the logic generated by the priority encoders 18 and 20, which is held by latch 34 of FIG. 1, insures that relays K1-K4 are energized in a manner such that the sum of all active flow restrictors will equal ⅝ inch to be equivalent to the diameter of the input conduits 60 and 62. For example, if switch S11 was depressed, then relays K1-K5 would be energized to open valves 64H-67H allowing only hot liquid to flow to conduit 68. If switch S10 was energized in FIG. 1, then only relays K2-K5 would be energized enabling hot liquid to flow through valves 65H-67H and cold liquid to flow through valve 64C. Relay K6 is connected to valve 69 and will be described in greater detail hereinafter with reference to FIG. 7 whereas relay K7 associated with a drain valve 95 will be described in greater detail with reference to FIG. 7. The novel flow restrictors 1FR-4FR in association with the logic shown in FIG. 1 enables an incremental increase in temperature from a hot and cold liquid conduit while simultaneously maintaining the proper pressure and flow rate therethrough. In case of any malfunction of the circuit of FIG. 4, only the cold liquid valves 64C-67C will be opened and hot liquid valves 64H-67H will be closed by relays K1-K4.

FIG. 6 is a side sectional view of a liquid level sensor 96 comprising a hollow tube 97 having float 98 containing a magnet thereon. Tube 97 is disposed adjacent the bathtub wall 99 and in fluid communication with a drain 95A. A plurality of reed switches S18-S26 are disposed immediately adjacent tube 97 enabling the magnetic float 84 to energize selective ones of switches S18-S26 depending on the level of liquid within tube 82. In this embodiment, switch S18 represents an empty container whereas S25 represents a full container with S26 indicating a maximum allowable level. FIG. 6 also shows a conventional overflow drain 95B which should be well known to those skilled in the art.

Figure 7:
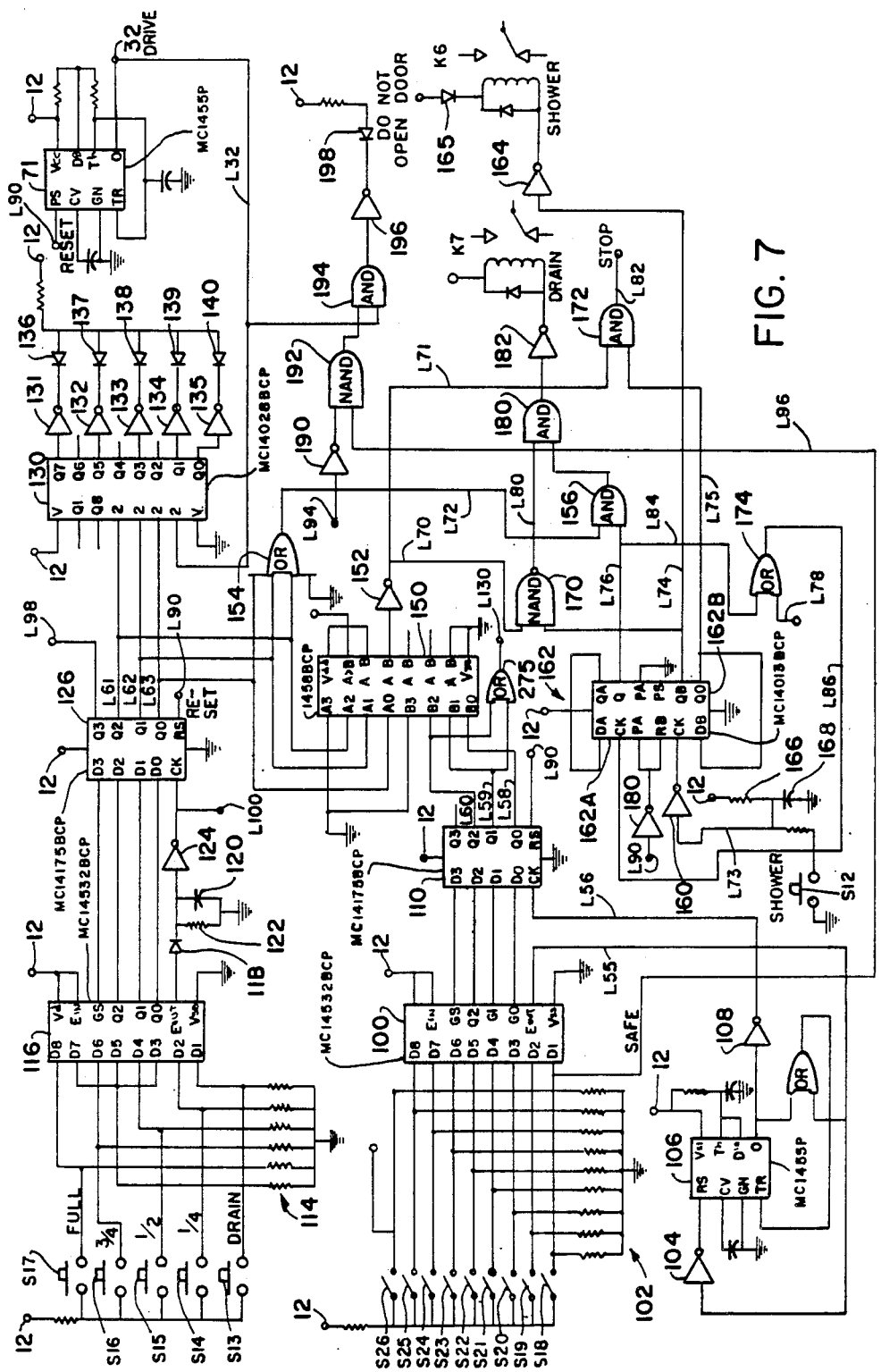
FIG. 7 is an electrical circuit diagram for controlling the level of liquid within the container.

FIG. 7 illustrates a circuit for controlling the liquid level within the container shown as a specific embodiment for a bathtub and associated shower. Switches S18-S26 shown in FIGS. 6 and 7 are connected to the inputs of a priority encoder 100 shown as a MC14532BCP. A matrix of pulldown resistors shown generally as 102 provide a low input when all of the switches S18-S26 are in the open condition. The priority encoder 100 operates in a manner similar to that heretofore described and provides a digital coded output on Q0-Q3 of the highest priority of switches S18-S26. The EOUT of priority encoder 100 is connected on line L55 to an inverter 104 to drive a timer 106. When one of the switches S18-S26 is energized, the EOUT of priority encoder 100 changes to a low state which is applied by inverter 104 to trigger timer 106. The output of timer 106 is applied through an inverter 108 on line L56 to a clock input of a latch 110. The timer 106 preferably provides a five second delay before providing an output to inverter 108. Accordingly, the float 98 must close one of the switches S18-S26 for a period of five seconds or latch circuit 110 will not accept the new information from switches S18-S26. In the application of a bathtub, this is particularly important since the water may be agitated by the occupant and accordingly misinformation of the real liquid level height within the container or bathtub will not be entered into the liquid level circuit.

If one of the switches S18-S26 is closed for a preset period of time, then latch 110 will accept the new information from priority encoder 100 to reestablish the liquid level data of the container. The circuit as disclosed may allow eight different levels, but it has been found for the present application that only four levels are required by the user. It should be understood that for other applications such as medical, industrial, commercial and the like, numerous other levels may be utilized within the practice of this invention.

Switches S13-S17 correspond to the levels shown in FIG. 6 which may be selected by the operator of the device. Switches S13-S17 are connected to a priority encoder 116 in a manner similar to the circuit described in FIG. 1. The EOUT of priority encoder 116 is connected through diode 118 to a RC time constant circuit comprising a capacitor 120 and resistor 122. The output of the time constant circuit is connected through an inverter 124 to a clock input of a latch 126. The outputs of the priority encoder 116 are applied to latch 126 with the EOUT of priority encoder 116 providing a short (millisecond) delay to allow data to stabilize before clocking data into latch 126 from the priority encoder 116.

Lines L61-L63 are connected to a decoder 130 such as a MC140288CP, the outputs of which are connected through inverters 131-135 to drive light emitting diodes 136-140. The light emitting diodes give a visual indication of the liquid level selected by the operator corresponding to switches S13-S17. The decoder 130 receives a periodic input from line L32 for flashing the light emitting diodes 136-140 commensurate with the periodic input on line L32.

An astable multivibrator 71 provides the periodic output on Line L32 to drive the decoder 130 as well as drive decoder 70 in FIG. 1, enabling the light emitting diodes 136-140 and 83-93 to flash in accordance with the periodic output of oscillator 71.

The output of latch 110 on lines L58-L60 and the output of latch 126 on lines L61-L63 are applied to an input of a four bit magnitude comparator 150 such as a 1458BCP, which determines whether the actual water level as measured by switches S18-S26 is greater than, equal to, or less than the selected level determined by the operator through switches S13-S17. Comparator 150 provides a high output to inverter 152 if the actual water level as determined by switches S18-S26 is less than the selected level by switches S13-S17. Accordingly, any time the liquid level measured is greater than or equal to the desired level, the output of inverter 152 will be high on lines L70 and L71.

The output of latch 126 is also applied to OR gate 154 which provides an output on line L72 to AND gate 156. A low output on line L72 indicates that S13 or a drain condition has been selected and the drain will open irrespective of the actual level of water as indicated by switches S18-S26 as will be described in greater detail hereinafter.

Switch S12 controlling the shower function, is connected by line L73 to an inverter 160 with the output thereof connected to the clock input of a bistable latch 162. The bistable latch shown as a MC14013BCP, is actually plural independent bistable latches 162A and 162B. The QB output of bistable latch L162A represents the "shower ON" function. An RC network comprising resistor 166 and capacitor 168 provides a suitable switch debounce circuit for the clock input through inverter 160 from switch 12. The bistable latch latch 162A will first produce a high output on the QB output upon closing switch S12. Thereafter, every time a S12 is closed an output will alternate between QB and the complement of QB of latch 162. A high output QB is connected on line L74 to an inverter 164 to energize relay K6 of valve 69 shown in FIG. 5.

Line L74 is connected to NAND gate 170 which also receives an output on line L70 from inverter 152. Accordingly, NAND gate will provide a low output on line L80 if the water level is greater than the selected level (a high output from inverter 152) and if the shower function is selected (a high output on line L74).

The complement of QB output of bistable latch 162B is connected on line L75 to AND gate 172. Line L71 from inverter 152 is connected to the other input of AND gate 172. Accordingly, the output of AND gate 172 on line L82 will be high only if the "NO shower" mode is selected (high on the complement of QB output) and the water level is greater than or equal to the selected value (high on line L71). Line L82 is connected through diode 16 of FIG. 1 to electrically simulate the closing of switch S1 thereby terminating operation of all water flow through valves 64–67 of FIG. 5.

The upper bistable latch 162A includes a QA output connected by Line L76 to AND gate 156. AND gate 156 also receives an output from OR gate 154 on line L72. The output on line L76 is also connected through a line L84 to an OR gate 174 with the other input from OR gate 174 emanating on line L78 from inverter 36 of FIG. 1. Accordingly, OR gate 174 will produce a high output on line L86 if either the output of inverter 36 is high indicating one of switches S1-S11 have been closed or a high output is present on line L76. The output of OR gate 174 is applied by line L86 to the clock input of bistable latch 162A. The output of line L76 is connected to AND gate 156, the output of which is connected to another AND gate 180. The output of AND gate 180 is connected through an inverter 182 to relay K7 shown in FIG. 5 to provide power to drain valve 95. Accordingly, drain valve 95 will be opened if the shower function is on (high on L72) and the level of the liquid is in excess of the selected level (high on L70). In addition, the output of AND gate 156 will be low thereby opening drain valve 95 anytime any one of switches S2-S11 are not selected (low on L72) or when the circuit is reset on reset 90 which is applied through an inverter 180 to reset latches 162A and 162B. The novel configuration between latch 162A and OR gate 174 enables the QA output of 162A to be high only on the using edge of the first pulse on line L78. Subsequent pulses on line L78 will be enjoined by the bistable latch 162A and can be reset only upon a suitable signal on line L190.

Referring now to FIG. 1, the output of OR gate 38, indicating that one of switches S2-S11 has been selected, is applied on line L94 to an inverter 190 to drive an input of NAND gate 192. The other input of NAND gate 192 is connected by a line L96 to switch S18 in FIG. 7. Switch S18 will be high only upon a nominal level of liquid. Accordingly, anytime that one of switches S2-S11 of FIG. 1 is selected indicating a liquid flowing condition concomitantly with more than a nominal level of liquid, this produces a low output from NAND gate 192 to an AND gate 194 and inverter 196 to power a light emitting diode 198. Accordingly, anytime the water is flowing as indicated by a high output from OR gate 38 on line L94 in FIG. 1 or the liquid level is more than a nominal level as indicated by switches S19-S26 in FIG. 7 being closed, NAND gate 192 will produce a high output which is combined with the drive output on line 32 from oscillator 71 to flash a light emitting diode 198 indicating the operator should not open the container door.

The line L98 from the Q3 output of latch 126 is connected to the EIN input of priority encoder 20 as shown in FIG. 1. The EOUT of priority encoder 20 provides an E input to priority encoder 18 on line L16. This arrangement requires a sequence for the operator, namely that a liquid level of either one of switches S13-S17 be selected prior to the operator being able to select the temperature of the liquid through switches S2-S11. This safety feature requires that the liquid level be set by the operator prior to any liquid flow through valves 64-67.

FIG. 8 illustrates a reset circuit whereby all circuits must be reset upon three independent occurrences. Switch S27 represents a switch disposed within an access door to the container. Accordingly, anytime switch S27 is open, a low will be applied to AND gate 200 to produce a low reset output on line L90. Additionally, if a power failure occurs from the low voltage supply shown in FIG. 4, then AND gate will provide an output to reset the circuit. Additionally if switch S26 of FIG. 7 is closed indicating more than a maximum level of liquid within a container as shown by FIG. 6, a high output will be applied to inverter 204 to produce a low output on AND gate 200 and concomitantly therewith a low output on line L90.

Figure 10:
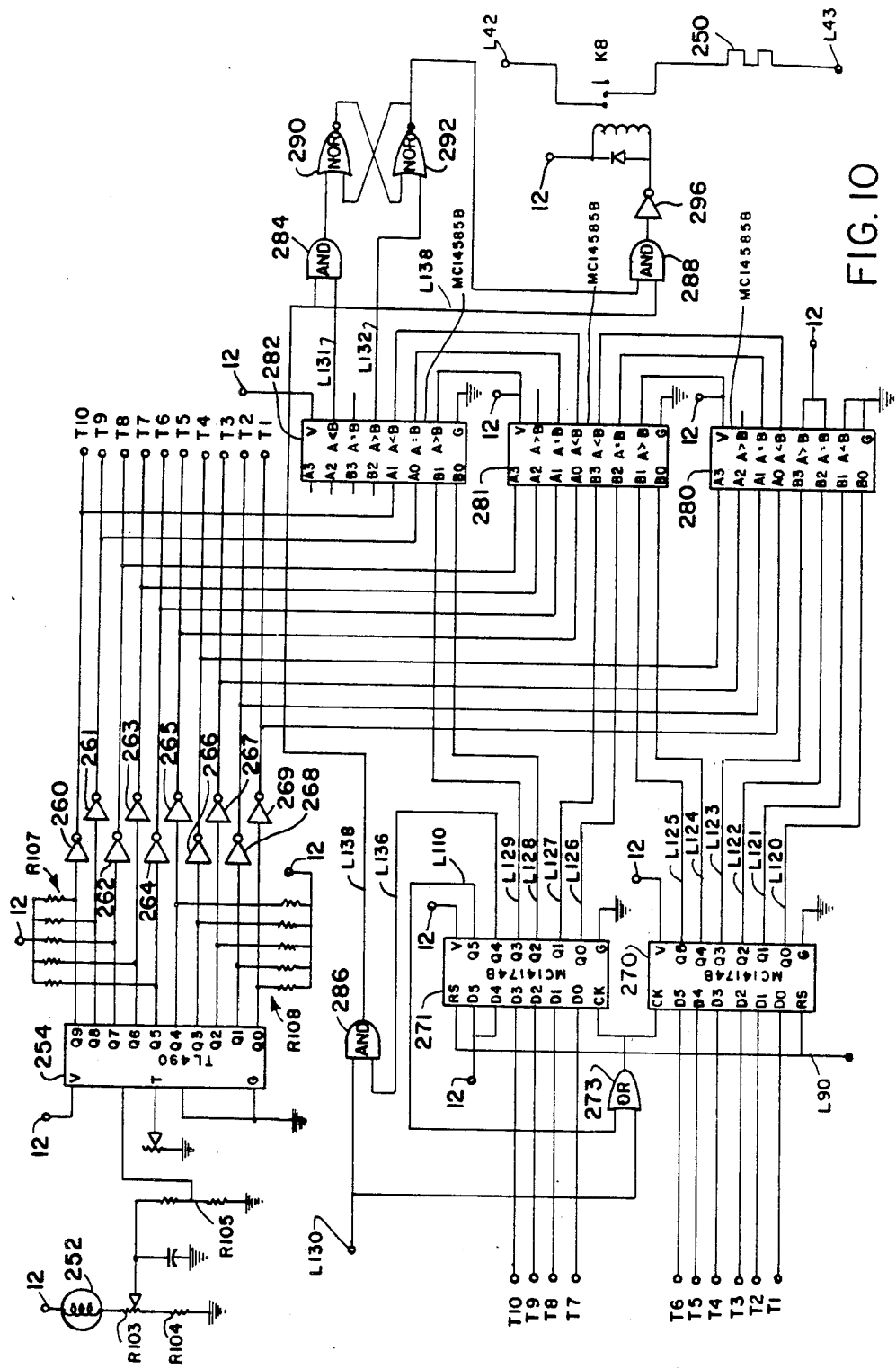
FIG. 10 is an electrical circuit diagram for controlling a liquid heater in the container.

The reset line L90 is applied to latch 34 in FIG. 1 as well as being applied to latch 126 in FIG. 7, timer 71 in FIG. 7, latch 110 in FIG. 7 and bistable latch 162a and 162b in FIG. 7 and latches 270, 271 in FIG. 10.

FIG. 9 illustrates an audible indicating device which cooperates with FIGS. 1 and 7 to provide an audible output upon the depression of switches S1-S11 and S13-S17. Line L78 from inverter 36 in FIG. 1 is connected to one input of an OR gate 210 whereas line L100 from inverter 124 of FIG. 7 is connected to the other input of OR gate 210. The output of OR gate 210 is applied through an inverter 212 to a one shot 214 to drive a piezo electric device 216. The one shot provides a suitable duration for the audible output of piezo device 216 upon a momentary depression of any of switches S1-S11 or S13-S17.

FIG. 10 is an electrical circuit diagram for controlling a liquid heater 250 in the container (not shown here) comprising a temperature sensing element 252 connected by potentiometer 103 and resistor 104. The resistivity of temperature sensor 252 changes as a function of temperature thereby producing a voltage at potentiometer 103 which is in accordance with the temperature of the liquid internal the container in which sensor 252 is immersed. The output of potentiometer 103 is connected through a voltage divider network R105 to an input of an analog to digital converter 254 shown as a TL490. The analog and digital converter 254 provides an output on one of Q0-Q9 in accordance with 100 millivolt incremental steps of the analog input. The outputs Q0-Q9 are normally high by virtue of pull-up resistor networks R107 and R108. The active output of the analog to digital converter 254 provides a low output to one of a series of inverters 260-269. The outputs of inverters 260-269 are connected to terminals T1-T10 as shown. The outputs T1-T10 of inverters 260-269 are connected by means not shown to inputs T1-T10 of two hex latches each shown as an MC41474B, 270 and 271. The Q5 output of latch 271 is connected by a line L110 to an OR gate 273, the output of which is applied to the clock inputs of latches 270 and 271. The Q5 output of latch 271 is a clock inhibit output which fixes the output of latches 270 and 271 until latches 270 and 271 are reset by a reset signal on line L90. Accordingly, temperature sensor 252 determines the temperature of the input liquid which is applied to latches 270 and 271 which fixes the initial temperate measured and provides a standardized output on lines L20-L129 to provide a standard or desired temperature for the heater circuit. An OR gate 275 connected to lines L59 and L60 in FIG. 7 provides an input on line L30 to OR gate 273 upon a Q1 or Q2 output of latch 110. Accordingly, the latches 270 and 271 are not energized to fix the standard temperature until the water level reaches a position to close at least switch 20. This arrangement ensures that a sufficient amount of liquid is contained within the container prior to fixing the standard temperature within latches 270 and 271.

The outputs of latches 270 and 271 are applied to lines L120-129 to comparators 280, 281 and 282, each shown as an MC14585B. Additionally, the outputs of inverters 260-269 are applied to comparators 280-282. The comparators 280 and 282 are interconnected as shown to provide an output on line L131 if the measured temperature is less than the standard temperature as held by latches 270 and 271 and to provide an output on line L132 if the measured temperature is greater than the standard temperature held by latches 270 and 271. The output of line L131 which indicates that the measured temperature is less than the desired temperature is applied to an AND gate 284. Line L130 from OR gate 275 is applied to an AND gate 286 in addition to the Q4 output of latch 271 being applied to AND gate 284 on line L136. The output of AND gate 284 provides a high output only when there is a sufficient level of liquid within the container as monitored by switches S19-S26 and when latches 270 and 271 have been set to desired temperature. The output of AND gate 286 is applied on line L138 to AND gate 284 and AND gate 288. Accordingly, AND gate 284 will produce an output to NOR gate 290 only when the level in the container is of sufficient desired level (output on line L130) and the desired temperature is latched into latches 270 and 271 (output on line L136) and the temperature of the liquid is less than the desired standard temperature (output on line 131).

NOR output 290 is cross coupled to a second NOR output 292 as a bistable device with NOR gate 292 receiving an input from line L132. The output of the NOR bistable is applied to AND gate 288 in addition to receiving an input on line L138. This configuration allows AND gate to produce an output to inverter 295 to energize relay K8 only when AND gate 284 provides a signal to the NOR bistable 290 and 292 in addition to having a high output from AND gate 286. Accordingly, if the circuit is reset or if the liquid level is drained below a nominal value, AND gate 288 will prevent the closing of relay K8. Relay K8 controls the line voltage to heater element 250.

Figure 11:
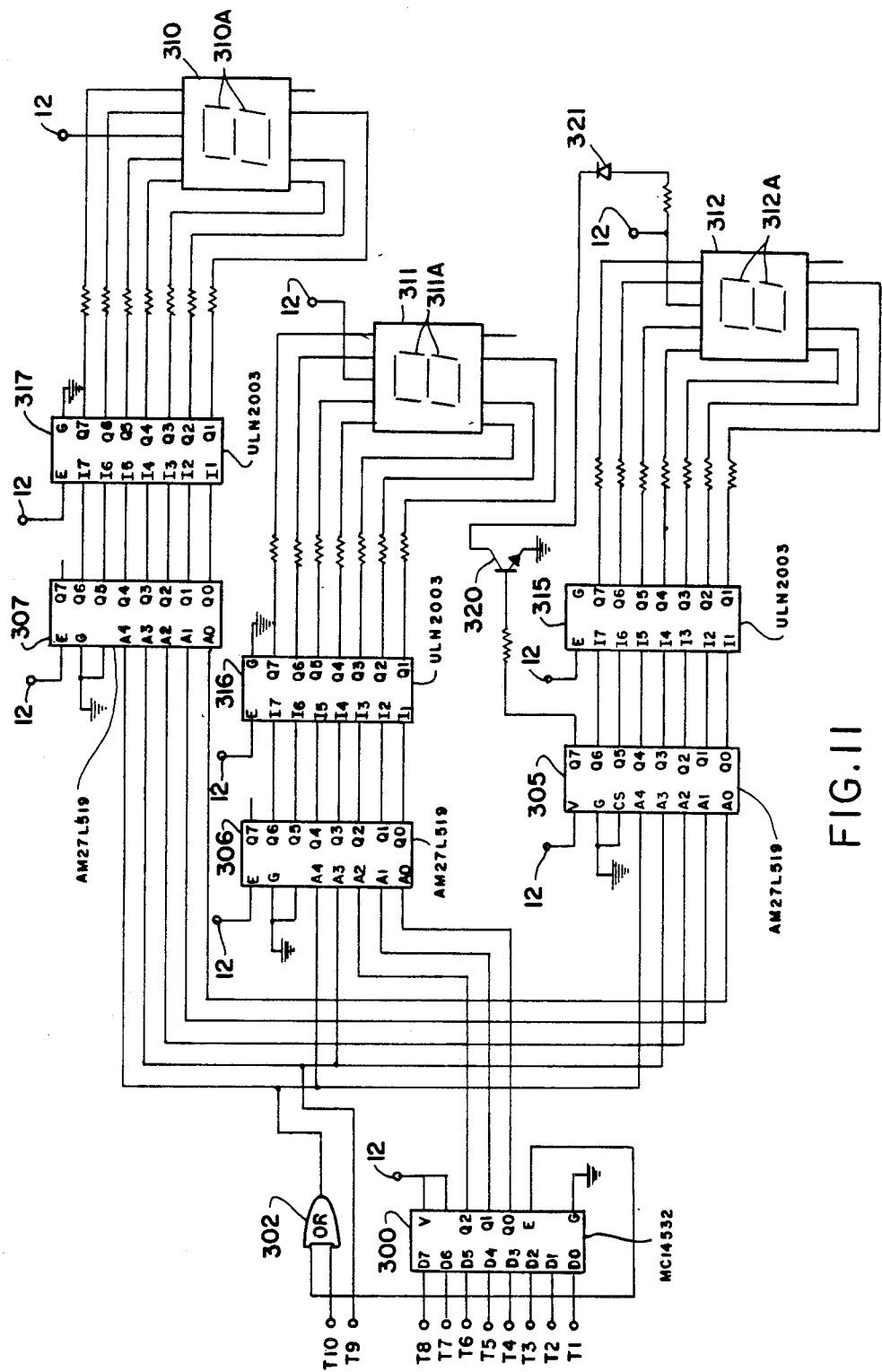
FIG. 11 is an electrical circuit diagram showing a display circuit for displaying the temperature of the liquid in the container.

FIG. 11 is a display circuit for displaying the temperature of the liquid as determined by thermistor 252. The outputs T1-T8 from inverter 260-269 are applied to a priority encoder 300 shown as an MC14532. An OR gate 302 receives the E output of priority encoder 300 in addition to the T10 input. The priority encoder 300 has been explained heretofore and its operation should be well known to those skilled in the art. The output of priority encoder 300 and OR gate 302 are applied to the inputs of programmable read-only memories (PROM) 305, 306 and 307. The PROMs 305-307 are shown as AN27L519 having 32 bytes at 8 bits per byte. The PROMs 305-307 receive the octal code from priority encoder 300, OR gate 302 and T9 to transform the octal code into signals for illuminating numerical display devices 310-312. The numerical display devices have display elements 310A, 311A and 312A which are illuminated in accordance with the signals generated by PROMs 305-307 to provide a digital output of the temperature of the liquid.

The outputs of PROMs 305-307 are applied to three integrated circuits 315, 316 and 317 shown as ULN2003, each containing a plurality of individual NPN Darlington transistors. The operation of the PROMs 305-307, the Darlingtons 315-317 and the displays 310-312 which are shown as FND507, should be well known to those skilled in the art. Transistor 320 receives an input from Q7 of PROM 305 to drive a light emitting diode 321 for providing a degree indicator.

The foregoing has described a novel electro-mechanical circuit and logic for providing controlled temperature liquid from a cold and hot liquid conduit as well as providing liquid level control, liquid heating and various other functions. The integrated circuits shown in the drawings have been labeled with conventional identification markings to illustrate the best mode of practicing the invention and to enable those skilled in the art to make and use the same. However, it should be understood that the inclusion of the specific devices incorporating the invention are by means of example and should not be construed as to be limiting on the claimed subject matter. Furthermore, the apparatus has been disclosed with specific reference to bathtub operation, but it should be understood by those skilled in the art that the invention herein described may be applied to other diverse applications.

What is claimed is:

1. A device for controlling the temperature of a liquid in a discharge conduit from a hot liquid source and a cold liquid conduit source, comprising in combination:
   a first plurality of valves interconnecting the hot liquid conduit to the discharge conduit;
   a second plurality of valves interconnecting the cold liquid conduit to the discharge conduit;
   first flow restriction means in said first plurality of valves for enabling selective flow rates of hot liquid from the hot liquid conduit to the discharge conduit;
   said first flow restriction means comprises a plurality of first ports respectively disposed in liquid flow relation to said first plurality of valves;
   said plurality of first ports including a port having a major port area and including a port having an intermediate port area and including a port having a minor port area;
   second flow restriction means in said second plurality of valves for enabling selective flow rates of cold liquid from the cold liquid conduit to the discharge conduit;
   said second flow restriction means comprises a plurality of second ports respectively disposed in liquid flow relation to said second plurality of valves;
   said plurality of second ports including a port having a major port area and including a port having an intermediate port area and including a port having a minor port area;
   said intermediate port area and said minor port area having a combined area being substantially equal to said major port area; and means for selectively energizing at least one of said plurality of valves for providing the proper temperature of the liquid emanating from the discharge conduit upon mixing the hot and cold liquids flowing through said selectively energized valves and for providing a constant liquid flow rate through the discharge conduit.

2. A device as set forth in claim 1 wherein each of said plurality of valves interconnected to the hot liquid conduit has a corresponding one of said plurality of valves interconnected with the cold liquid conduit with each of said corresponding valves having an identical port area; and said means for selectively energizing said plurality of valves enabling only one of said corresponding valves having the identical port area to be opened at a given time.

3. A devices as set forth in claim 1 including:

temperature selecting switch means for selecting a desired output temperature of the liquid;

memory means for storing the value of said desired output temperature of the liquid; and means connected to said memory means for selectively energizing said plurality of valves to provide for proper output liquid temperature in accordance with said memory means.

4. A device as set forth in claim 3 including means for displaying the desired output temperature of the liquid selected by said temperature selecting switch means.

* * * * *